United States Patent Office 3,544,323
Patented Dec. 1, 1970

---

3,544,323
DIAZO COMPOUND FOR LITHOGRAPHIC PLATES
Ho Chien Hwang, Peabody, Mass., assignor to Sumner Williams, Inc., East Boston, Mass., a corporation of Massachusetts
No Drawing. Filed Dec. 12, 1966, Ser. No. 600,748
Int. Cl. G03c 1/54; G03f 7/08
U.S. Cl. 96—75          10 Claims

ABSTRACT OF THE DISCLOSURE

A diazo compound formed by the reaction of one mole of 3-amino-9-ethyl-carbazole with one mole or more of 2-diazo-1-naphthol-5-sulfonyl chloride was found to provide a light sensitive material for a wide variety of lithographic plates including positive and negative, smooth and grained, and mono- to tri-metallic surfaces.

---

This invention relates to a novel diazo compound useful in the production of lithographic printing plates and the like. In particular it relates to such diazo compound which has sufficient stability for use in pre-sensitized lithographic printing plates.

The novel diazo compound of this invetnion comprises the reaction product of one mole of 3-amino-9-ethyl-carbazole and at least one mole of 2-diazo-1-naphthol-5-sulfonyl chloride. The infra-red spectra of the reaction product show it to be distinctly different from the starting materials. Hence, the reaction product is believed to comprise essentially the 2-diazo-1-naphthol-5-sulfonamide of 3-amino-9-ethyl-carbazole. The product of this invention is typically water-insoluble and cyclohexanone-soluble. When the product of this invetnion is coated onto a suitably prepared lithographic plate, which can be exposed as a positive plate, the light will decompose the diazo compound where it strikes and convert it into an alkali-soluble compound. The areas not struck by light are alkali resistant.

The reaction of the ingredients to form the product of this invention is shown by the formulas and equation below:

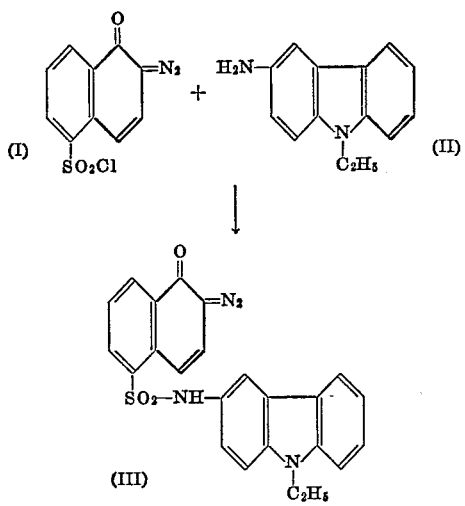

As a specific example of this invention, 10 grams of 3-amino-9-ethyl-carbazole, technical grade, having a melting point of about 98 to 100° C. were dissolved in 170 ml. of p-dioxane. To this were slowly added 16 grams of 2-diazo-1-naphthol-5-sulfonyl chloride, which has a melting point of approximately 135° C. A brown precipitate began to form during the addition and increased in volume with stirring. The mixture was then warmed to 42° C. and to it was added 43 ml. of 3 N sodium carbonate.

After this the solution was further warmed to 50° C. and then allowed to cool to room temperature and then stirred for an hour and 15 minutes. 294 ml. of distilled water was then added dropwise and the mixture stirred for 15 minutes. The mixture was then stored at about 5° C. for 17 hours. The precipitate was then collected on a suction funnel, washed thoroughly with water and dried at room temperature to yield 20.5 grams of a greenish-brown diazo compound having a melting point in the range of 175 to 180° C. Infra-red spectral examination of the product showed absence of the characteristic peaks for sulfonyl chloride, but the presence of sulfonamide. Accordingly, the product is believed to be essentially the 2-diazo-1-naphthol-5-sulfonamide of 3-amino-9-ethyl-carbazole. In the description below this product will be referred to as the sensitizer.

As an example of this invention, the sensitizer was utilized in the making of a positive lithographic plate. The plate was formed from an aluminum plate which was 0.009 inch thick. The aluminum plate was first degreased with a strong alkali solution using a spray-type washing machine at a temperature in the range of 60 to 70° C. The plate was then thoroughly rinsed with a spray of water and dried under radiant heat.

This dried, degreased plate was then mechanically grained with air-fluidized aluminum oxide abrasive until it showed a grain depth of 8 microns. The grained plate was then jet-washed with hot solution of 3% sodium carbonate at a temperature of 75° C. to remove the grained particles, washed free of sodium carbonate by a cold water spray and then dried by infra-red heat.

The plate was then coated with sensitizing composition comprising the following ingredients:

| | Grams |
|---|---|
| Alkali-resistant water-insoluble polyvinyl acetate resin | 10 |
| Sensitizer | 10 |
| Cyclohexanone | 80 |

The coated light sensitive aluminum layer was then exposed in a vacuum frame beneath a positive original for 3 minutes using an arc lamp as light source. After the exposure the plate was developed with a developer consisting of the following composition:

| | Grams |
|---|---|
| Sodium metasilicate | 5 |
| Sodium alkyl aryl sulfonate | ½ |
| Water | 94½ |

A positive image was obtained which was rinsed with water. The plate was washed with 3% phosphoric acid, inked with greasy ink, and placed on a press. A good quality image and long press life was obtained.

Although the above example refers to use of the novel diazo compound of this invention with a mechanically grained aluminum plate, this compound can also be used as a light sensitive material for other lithographic plates, e.g. smooth single metal plates and bi-metallic and tri-metallic plates wherein etching steps for resists are involved. Further, the novel diazo compound of this invention can be used alone as the light sensitive layer, as for example a silicated plate made in accordance with U.S. Pat. No. 2,714,066. This compound can be used for both positive and negative working plates and also for both "wipe-on" and pre-sensitized plates.

I claim:
1. The 2-diazo-1-naphthol-5-sulfonamide of 3-amino-9-ethyl carbazole.
2. A lithographic printing plate having a light sensitive layer comprising the compound of claim 1.
3. A lithographic printing plate comprising a metal surface coated with amixture of the compound of claim 1 with an alkali-resistance water-insoluble resin.

4. A positive lithographic printing plate comprising a metal surface coated with a light sensitive layer comprising the compound of claim 1.

5. A positive lithographic rinting plate comprising a mechanically grained aluminum surface coated with a mixture of the compound of claim 1 with an alkali-resistant water-insoluble resin.

6. A water-insoluble light sensitive material, characterized as being convertible from alkali-insoluble to alkali-soluble upon interaction with light, and formed by the reaction of one mole of 3-amino-9-ethyl-carbazole with one mole or more of 2-diazo-1-naphthol-5-sulfonyl chloride.

7. A lithographic printing plate having a light sensitive layer comprising the compound of claim 6.

8. A lithographic printing plate comprising a metal surface coated with a mixture of the compound of claim 6 with an alkali-resistant water-insoluble resin.

9. A positive lithographic printing plate comprising a metal surface coated with a light sensitive layer comprising the compound of claim 6.

10. A positive lithographic printing plate comprising a mechanically grained aluminum surface coated with a mixture of the compound of claim 6 with an alkali-resistant water-insoluble resin.

References Cited

UNITED STATES PATENTS

| | | | |
|---|---|---|---|
| 2,772,972 | 12/1956 | Herrick et al. | 96—91 XR |
| 3,046,110 | 7/1962 | Schmidt | 96—91 XR |
| 3,046,117 | 7/1962 | Sus | 96—49 XR |
| 3,046,121 | 7/1962 | Schmidt | 96—91 XR |
| 3,201,239 | 8/1965 | Neugebaver et al. | 96—36.3 |

FOREIGN PATENTS 699,413    11/1953    Great Britain.

OTHER REFERENCES

Kosar, J.: "Light Sensitive Systems," J. Wiley & Sons, October 1965, pp. 339, 342–352.

NORMAN G. TORCHIN, Primary Examiner

C. BOWERS, Assistant Examiner

U.S. Cl. X.R.

96—33, 91; 260—141